United States Patent [19]

Premiski et al.

[11] Patent Number: 4,934,842
[45] Date of Patent: Jun. 19, 1990

[54] AXIAL NEEDLE BEARING

[75] Inventors: Vladimir Premiski; Claudia Premiski, both of BAM-Willerscheidt; Kurt Graef; Seghart Biedermann, both of Pulheim, all of Fed. Rep. of Germany

[73] Assignee: Ford Motor Company, Dearborn, Mich.

[21] Appl. No.: 368,002

[22] Filed: Jun. 19, 1989

[30] Foreign Application Priority Data

Jul. 6, 1988 [DE] Fed. Rep. of Germany ....... 3822779

[51] Int. Cl.$^5$ ............................................. F16C 19/30
[52] U.S. Cl. .................................. 384/606; 384/620; 384/622
[58] Field of Search ............... 384/606, 620, 622, 621, 384/584, 616

[56] References Cited

U.S. PATENT DOCUMENTS

| | | | |
|---|---|---|---|
| 3,981,549 | 9/1976 | Carullo | 384/622 |
| 4,166,662 | 9/1979 | Chiba et al. | 384/622 |
| 4,368,932 | 1/1983 | Wolzenburg | 384/622 |
| 4,733,979 | 3/1988 | Tsuruki | 384/620 |

FOREIGN PATENT DOCUMENTS 2753812 6/1978 Fed. Rep. of Germany .
3643584 8/1987 Fed. Rep. of Germany .

Primary Examiner—Lenard A. Footland
Attorney, Agent, or Firm—Frank G. McKenzie; Donald J. Harrington

[57] ABSTRACT

An axial needle bearing assembly includes needles guided in a needle cage and located between thrust washers. The needles are distributed about the axis of the assembly and spaced angularly apart by the cage. The cross section of the thrust washers are L-shaped having nested legs surrounding the needles. One thrust washer has its leg inclined with respect to the legs of the other thrust washer and spaced apart defining a region in which lubricant is contained. At several angularly spaced locations, beads are formed on a leg of one of the thrust washers which overlap the other thrust washer and prevent disassembly but permit axial play between the thrust washers.

3 Claims, 2 Drawing Sheets

AXIAL NEEDLE BEARING

BACKGROUND OF THE INVENTION

1. Field of the Invention

This invention relates to the field of axial needle bearings of the type having needles mutually spaced by a sheet metal cage and thrust washers defining races on which the needles turn.

2. Description of the Prior Art

German Offenlegungsschrift 27 53 812 describes a needle bearing having non-guided needles and thrust washers formed from punched and drawn sheet metal. At the inner and outer periphery of the thrust washers, sleeve attachments, directed toward one another, are bent approximately at right angles. An annular cap cooperates with the sleeve attachments to form an axial needle bearing assembly.

This needle bearing has the disadvantage that the angular cap must be additionally positioned in order to manipulate the needle bearing for easy assembly.

German Offenlegungsschrift 36 43 584 describes a needle bearing assembly in which needles, guided in a needle cage of sheet metal, cooperate with thrust washers, of punched and drawn sheet metal, provided on the outer periphery and inner periphery with sleeve attachment directed toward one another and bent approximately at right angles. Conical, angular edges directed radially inward or radially outward cooperate with the needle cage to form an axial needle bearing element assembly, which is easy to manipulate during assembly. This needle bearing element requires additional axially extending lugs to center the thrust washers of the bearing internally or externally.

SUMMARY OF THE INVENTION

An object of this invention is to provide an improved axial needle bearing that is not only easier to manipulate during assembly but also is positioned on one component, which centers it externally with respect to first and second thrust washers without adversely affecting its operation.

This object is realized according to this invention because the axial needle bearing assembly includes a cylindrical sleeve attachment on one thrust washer and the other sleeve attachment of the other thrust washer is made to project inward in a tapered manner and to engage axially inward over one sleeve attachment. The second thrust washer is connected to the sleeve attachment with axial play, but they are not detachable axially because of the presence of beads or studs pressed radially outward at four, angularly spaced locations. Because of this arrangement, the free, flat outer peripheries of the two thrust washers of the bearing can be produced with exactly the same diameter and the same mounting as is provided for centering on one component.

BRIEF DESCRIPTION OF THE DRAWINGS

The invention is explained in greater detail with reference to an embodiment, in which.

DESCRIPTION OF THE PREFERRED EMBODIMENT

Figure 1:
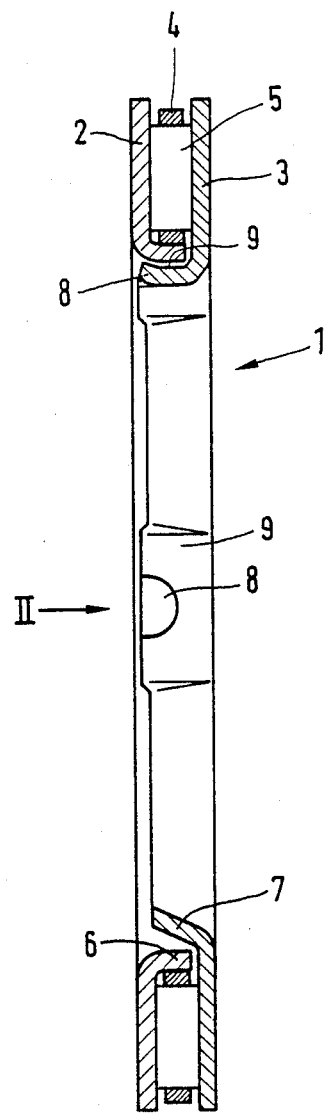
FIG. 1 is a cross section through a plane I—I of FIG. 2 of an axial needle bearing element according to this invention.

The axial needle bearing assembly 1 of FIG. 1 includes a thrust washer 2 and a complementary thrust washer 3, both formed by punching from drawn sheet metal. Multiple needles 5 located between the thrust washers and distributed uniformly about the central axis of the assembly are held in position and spaced mutually by a needle cage formed of sheet metal.

The cross section of thrust washer 2 is L-shaped and includes a short leg or sleeve bent perpendicular to the longer leg and extending toward the other thrust washer 3. The cross section of thrust washer 3 is also L-shaped having a short leg or sleeve 7 projecting axially and radially inward, inclined with respect to its longer leg and fitted over sleeve 6 of thrust washer 2.

Figure 2:
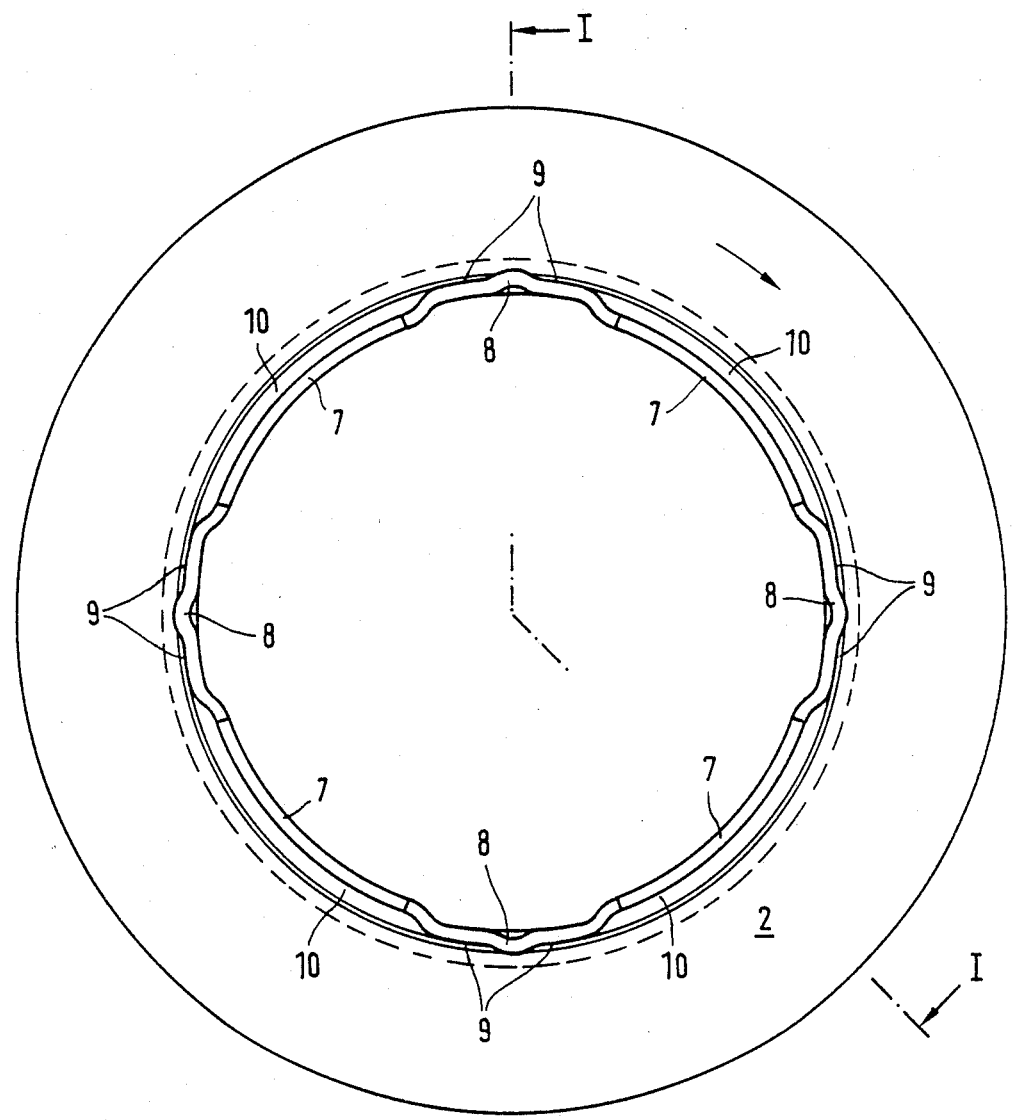
FIG. 2 is an elevation view of the needle bearing element of FIG. 1 taken in direction II.

FIG. 2 shows four regions, distributed angularly about the central axis of the bearing assembly, where tapered sleeve attachment 7 is deformed locally to define beads 8 pressed radially outward overlapping and interlocking with sleeve 6 thereby allowing axial movement relative to thrust washer 2, but preventing detachment of the thrust washers.

Cylindrical, arcuate guide surfaces 9 are provided on tapered sleeve 7 adjacent beads 8. Due to contact between guide surfaces 9 and cylindrical sleeve 6, the guide surfaces radially center and guide thrust washer 2 of the bearing relative to thrust washer 3.

The portions of tapered sleeve 7 of thrust washer 3, located on the periphery of the sleeve between guide surfaces 9, form collecting funnels 10, directed radially and axially inward. The funnels contain lubricants that flow radially inward toward the region of the needles.

Having described a preferred embodiment of our invention, what we claim and desire to secure by U.S. Letters Patent is:

1. An axial bearing assembly comprising:
   needles;
   cage means for holding the needles mutually spaced and distributed angularly about the axis of the assembly;
   a first thrust washer having a first surface and a first sleeve located at the radially inner periphery of the second surface and directed substantially perpendicular to, and axially inward from, the first surface;
   a second thrust washer having a second surface spaced axially from the first surface and defining therebetween a space in which the needles and cage are located, a second sleeve located at the radially inner periphery of the second surface inclined radially inward, and axially away from, the second surface, and beads formed on the second sleeve angularly spaced mutually about the axis of the assembly, overlapping the first sleeve and permitting axial movement relative to the first thrust washer but preventing disassembly from the first thrust washer.

2. The assembly of claim 1 wherein the second sleeve further includes arcuate guide means angularly spaced about the axis of the assembly adjacent the beads, contacting the first sleeve for centering the first and second thrust washers.

3. The assembly of claim 1 wherein the first sleeve and second sleeve define a lubricant reservoir therebetween, the inclined surface of the second sleeve directed toward the space where the needles and cage are located.

* * * * *